(12) United States Patent
Gale et al.

(10) Patent No.: US 7,568,120 B2
(45) Date of Patent: Jul. 28, 2009

(54) METHOD, APPARATUS, AND COMPUTER PROGRAM FOR HANDLING WEB SERVER FAILURE

(75) Inventors: Martin J. Gale, Eastleigh (GB); David Locke, Chandlers Ford (GB)

(73) Assignee: International Business Machines Corporation, Armonk, NY (US)

( * ) Notice: Subject to any disclaimer, the term of this patent is extended or adjusted under 35 U.S.C. 154(b) by 406 days.

(21) Appl. No.: 11/533,806

(22) Filed: Sep. 21, 2006

(65) Prior Publication Data

US 2007/0067453 A1 Mar. 22, 2007

(30) Foreign Application Priority Data

Sep. 21, 2005 (GB) .................................. 0519246.3

(51) Int. Cl.
*G06F 11/00* (2006.01)
(52) U.S. Cl. .......................................... 714/4; 709/224
(58) Field of Classification Search ........................ None
See application file for complete search history.

(56) References Cited

U.S. PATENT DOCUMENTS

| | | | | |
|---|---|---|---|---|
| 5,933,596 | A * | 8/1999 | Mayhew | 709/203 |
| 5,974,445 | A * | 10/1999 | Pivnichny et al. | 709/203 |
| 7,058,633 | B1 * | 6/2006 | Gnagy et al. | 707/10 |
| 2002/0056053 | A1 | 5/2002 | Vine et al. | |
| 2003/0014526 | A1 * | 1/2003 | Pullara et al. | 709/227 |
| 2003/0204769 | A1 * | 10/2003 | Coughlin | 714/4 |
| 2006/0179147 | A1 * | 8/2006 | Tran et al. | 709/227 |
| 2006/0190308 | A1 * | 8/2006 | Janssens et al. | 705/5 |
| 2006/0218304 | A1 * | 9/2006 | Mukherjee et al. | 709/246 |
| 2008/0281754 | A1 * | 11/2008 | Kelley et al. | 705/39 |

FOREIGN PATENT DOCUMENTS

EP 1139221 A1 10/2001
WO WO2004004283 A1 1/2004

OTHER PUBLICATIONS

PingIT v2.1 Desktop Software, http://www.dswsoft.com/pingit.php.
Module mod_rewrite URL Rewriting Engine, http://httpd.apache.org/docs/1.3mod/mod rewrite.html.

* cited by examiner

*Primary Examiner*—Christopher S McCarthy
(74) *Attorney, Agent, or Firm*—Grasso PLLC

(57) ABSTRACT

To handle web server failures, a client comprises a health monitor for monitoring the status of the web server, the client being an originator of requests for web pages from the web server. The health monitor receives status information for the web server. If the health monitor determines that the web server has failed, the health monitor redirects requests for web pages hosted by the failed web server to another web server that is working.

20 Claims, 3 Drawing Sheets

METHOD, APPARATUS, AND COMPUTER PROGRAM FOR HANDLING WEB SERVER FAILURE

FIELD OF THE INVENTION

The invention relates to web server failure.

BACKGROUND

If a user of a web browser selects a link to a web page and the server hosting that web page has failed, the user may receive an error message such as a "404 error". Such a message is typically uninformative and is unhelpful from the user's perspective. Continued failure to load the web page, or other web pages hosted by the same failed server, may cause the user to take their business elsewhere.

There are a number of well known solutions to this problem, which typically involve putting additional nodes between the web browser and the web server. These include the likes of proxy servers and load balancers that are aware of the status of web servers and ensure that web requests are routed to working servers. U.S. Patent Application 2002/0056053 discloses an intermediate server for monitoring web requests and for redirecting client requests in the event of a failure.

Other solutions include clustering solutions that enable the IP address and host name of a failing web server host to be taken over by another host.

All of the existing solutions require either additional nodes or complex cluster management code, which adds to the cost and complexity of any solution. Matters typically relating to available budget and hardware constraints may mean that this is not be a viable option in some situations.

SUMMARY

According to a first aspect, the invention provides a health monitor method operable at a client for handling web server failure, the client being an originator of requests for web pages from the web server, the method comprising: receiving status information for the web server; and, responsive to determining that the web server has failed, redirecting client requests for web pages hosted by the web server to another web server which is working.

In one embodiment, the health monitor periodically requests the status information. In a preferred embodiment, such information is "pushed" by a health service monitoring the web server to the health monitor. In yet another embodiment, the network protocol itself may be used to detect failure. For example, if a TCPIP link fails or a machine (service on a machine) to which there is a TCPIP connection, the protocol informs a connecting client of this fact.

In the embodiment where the health monitor actually requests status information, such information may be requested in response to a request by the client to link to a page hosted by the web server.

In a preferred embodiment, a web page hosted by the web server is downloaded and client requests originate from this web page, for example by clicking a URL link.

The web page preferably comprises a plurality of links. In one embodiment, redirecting client requests comprises retrieving all web page links which link to the failed web server and rewriting retrieved web page links in order that they point to the other web server. Note, there could be multiple other web servers. One is chosen, but one of the others may be used in the event that the chosen web server fails. Such a web page may also link to pages on a web server which has not failed. These links do not need to be rewritten.

In another embodiment, activation by a user of a link causes a link function to determine which server is to be linked to. Responsive to determining that the web server hosting the web page requested has failed, the link function is used to access the other web server.

In another embodiment, a request is received for a particular web page. Responsive to determining that the web server hosting the web page has failed, the health monitor modifies the link requested to point to the other working web server.

In one embodiment, the health monitor is downloaded with an initial web page. The web page comprises a content frame for displaying visible content and a control frame containing the health monitor.

In another embodiment, the health monitor may be a generic plugin which can be configured to work with the appropriate web server.

In one embodiment, the health monitor receives a list of one or more alternate servers that can be used in the event of a server failure. In another embodiment, the health monitor is configured with one or more alternative servers to be used in the event of failure.

Status information about the workload being experienced by each of a plurality of possible alternative web servers may be received by the health monitor. This information can then be used to select an appropriate web server in the event of a web server failure.

According to another aspect, there is provided a health monitor operable at a client and for handling web server failure, the client being an originator of requests for web pages from the web server, the health monitor comprising: means for receiving status information for the web server; and means, responsive to determining that the web server has failed, for redirecting client requests for web pages hosted by the web server to another web server that is working.

BRIEF DESCRIPTION OF THE DRAWINGS

A preferred embodiment of the present invention will now be described, by way of example only, and with reference to the following drawings, in which.

DETAILED DESCRIPTION

The present invention, in accordance with a preferred embodiment, provides functionality which may be loaded into a client's web browser. Such functionality can detect the failure of a web server and automatically re-direct new web page requests to an alternative server in the event of such a failure.

Figure 1:
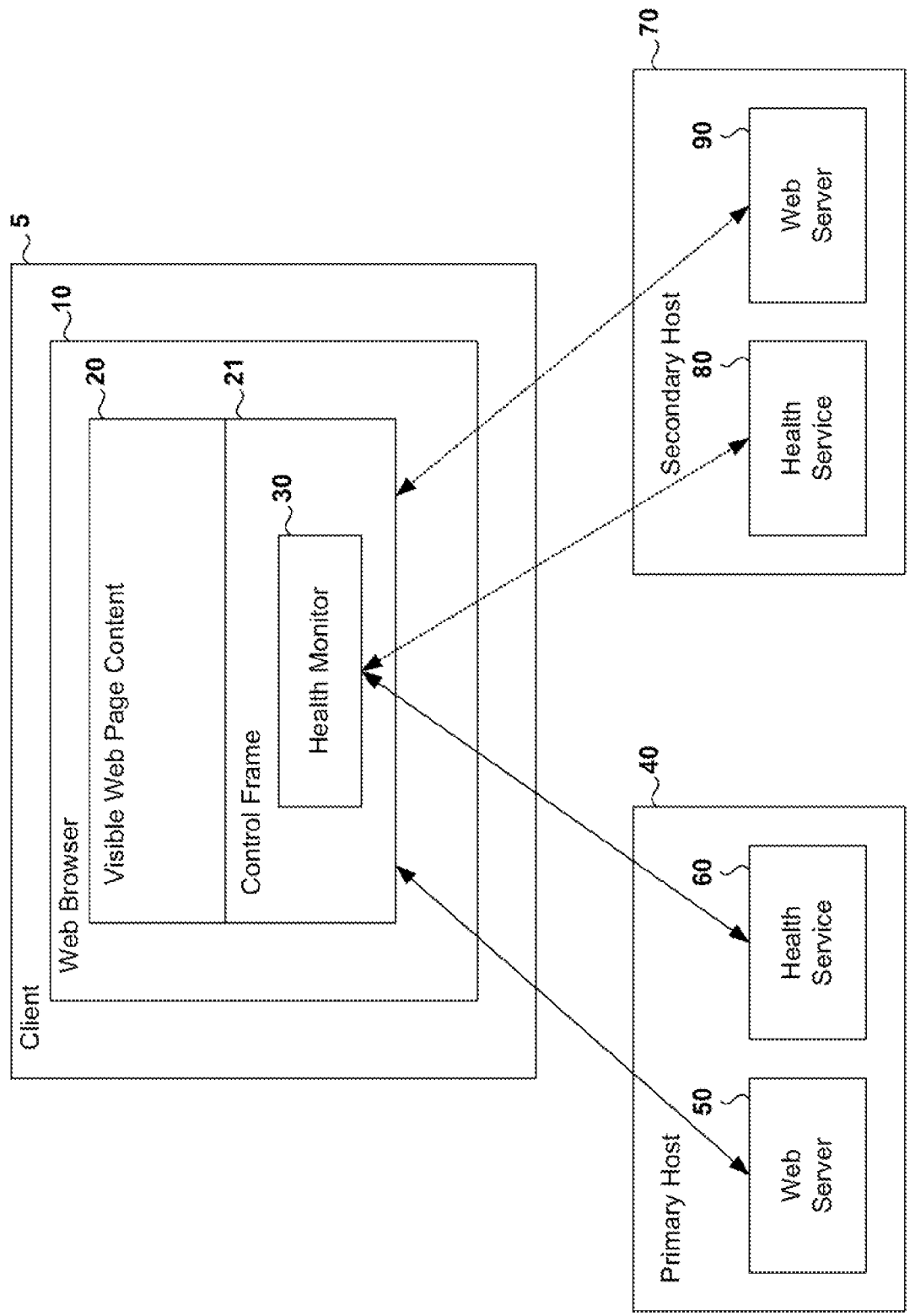
FIG. 1 illustrates components of the present invention in accordance with a preferred embodiment.
Figure 2:
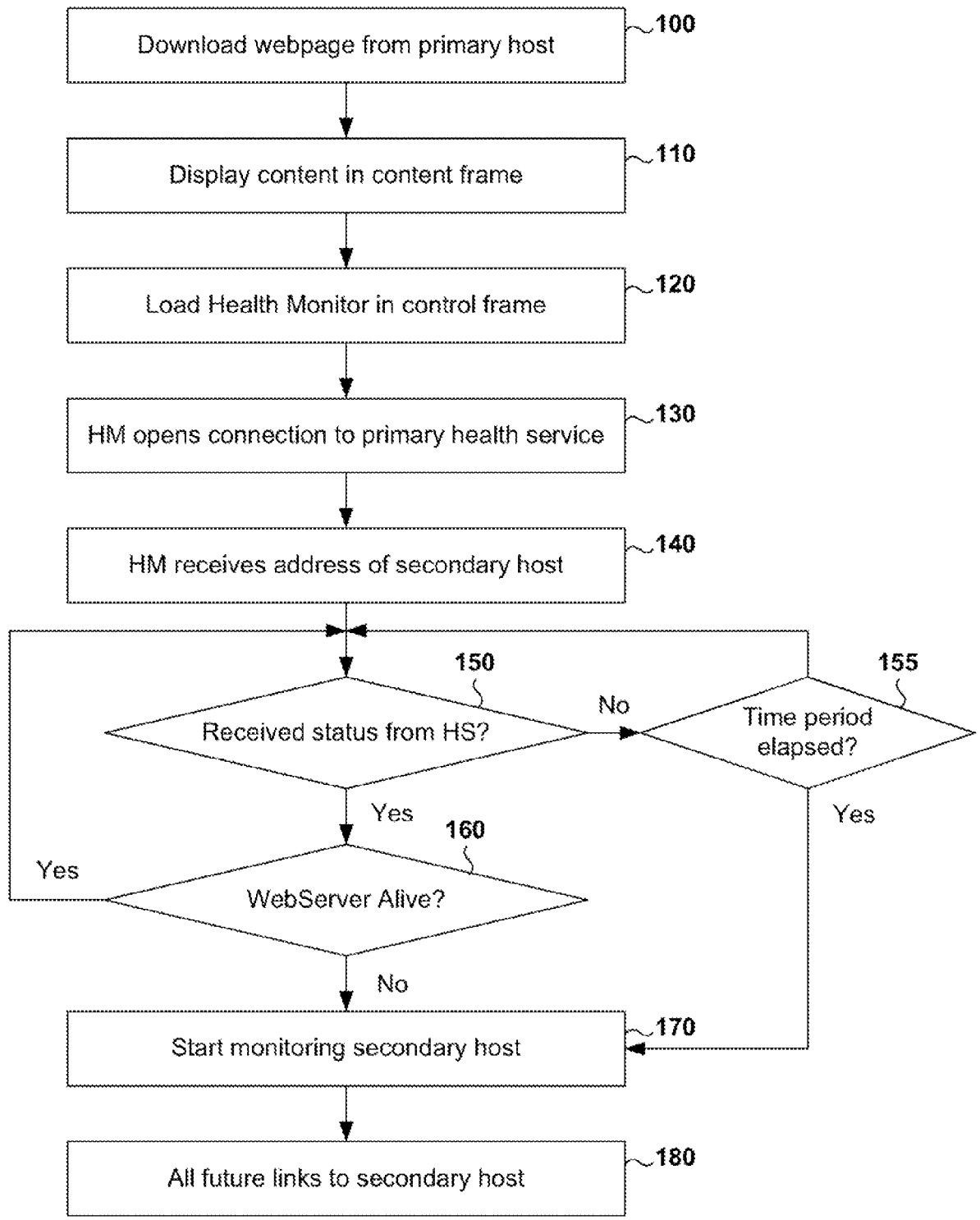
FIG. 2 illustrates processing of the present invention in accordance with a preferred embodiment.
Figure 3A:
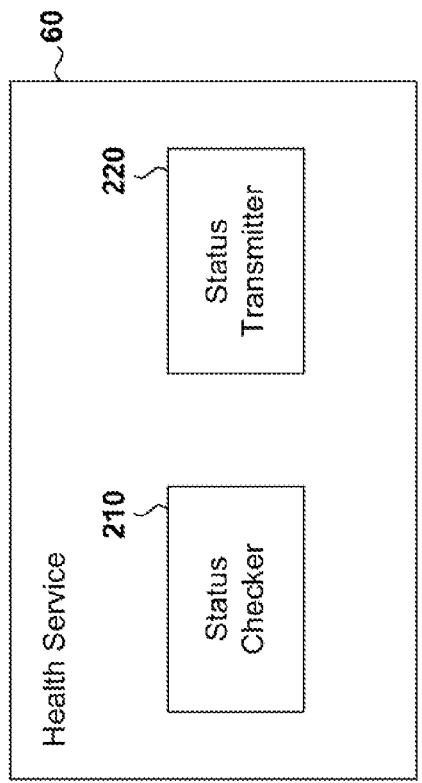
FIG. 3a shows the health service of a preferred embodiment in more detail.
Figure 3B:
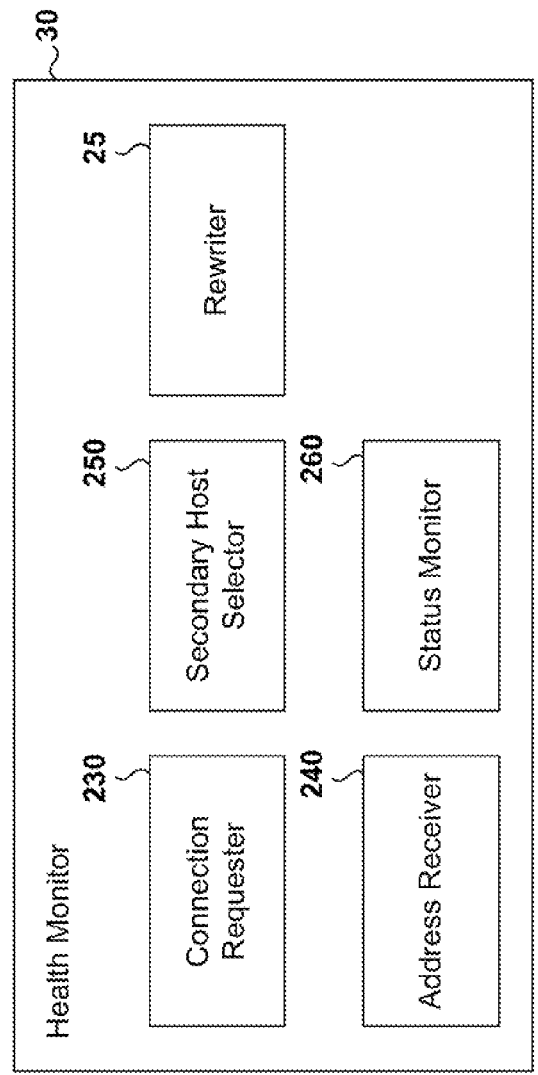
FIG. 3b shows the health monitor of a preferred embodiment in more detail.

FIGS. 1, 3a and 3b illustrate components of the present invention in accordance with a preferred embodiment, whilst FIG. 2 shows the processing of a preferred embodiment of the present invention. The figures should be read in conjunction with one another. As shown in FIG. 1, a client 5 runs a web browser 10. The client connects via the web browser to a primary host 40, hosting a web server 50, and downloads a web page from the web server for display by the web browser (step 100 of FIG. 2). The web page preferably comprises two frames: a content frame 20; and an invisible "control" frame 21. The web browser displays the visible content of the page (and subsequent web pages) in frame 20 (step 110). The control frame comprises a health monitor (HM) 30 which is loaded by the web browser therein (step 120). The health monitor may be, by way of example, a Java™ applet, and the components thereof are discussed in more detail with reference to FIG. 3b. (Java and all Java-based trademarks and logos are trademarks of Sun Microsystems, Inc. in the United States, other countries, or both). The advantage of running the health monitor in a separate frame is that this allows the health monitor to continue on running, even when new pages are loaded into the content frame.

The health monitor receives status information from a health service 60, as described in more detail with reference to FIG. 3a, running on the primary host 40. The health service 60 keeps track of the state of the web server and pushes out such status information to the health monitor.

Thus, once the health monitor has been loaded into the invisible control frame and initialized, the health monitor opens a connection (via connection requester 230) to the health service 60 (step 130). This could be done by way of a basic socket connection.

At step 140 the health monitor requests (and receives) from the health service 60 the address, via Address Receiver 240, of one or more secondary hosts that could be used in the event of failure of the primary host's web server 50. An alternative is for the health monitor to be preconfigured with a list of servers. Another option is for the health service to return the address of an alternative web server in response to a specific request for a web page on a failed server.

The status monitor 260 determines passively at step 150 when status information is received from status transmitter 220. An alternative is for the health monitor to periodically request web server status proactively. However, this embodiment is less preferred because it adds to network congestion.

FIG. 3a illustrates the health service in more detail. Status Checker component 210 attempts to communicate with web server 50 in order to determine whether the web server is alive, and pushes status information out via status transmitter 220 to health monitor 30. If such status information is received, it is used by the health monitor to determine whether the web server is alive (step 160). If the web server is alive, then the processing of FIG. 2 loops round.

The status checker 210 may determine, however, that the web server 50 has failed. If this is the case, then the status monitor will be informed of this fact.

Failure of the web server may also be assumed by the status monitor if no status information has been received for a predetermined period of time (step 155). In another embodiment, the network protocol being used to connect to the health service (e.g. TCPIP) may determine that there has been a failure.

Irrespective of the way in which the failure is determined, it is now up to the health monitor 30 to choose a new host to service the web browser's subsequent requests for web pages. Secondary Host Selector 250 selects a new host. Component 250 selects from the list returned by address receiver 240 and starts monitoring the selected secondary host 70 (step 170). If more than one address is returned to component 250, then the selection could be an arbitrary one, or selected in some other way. For example, a round robin algorithm could be used. Another option is for the health service to provide the health monitor with information on server load and for the health monitor to makes its selection based on such information.

Such load information is preferably gathered at the point when failure is determined so that it is current.

The chosen secondary host preferably comprises another web server 90 which hosts identical web pages to those hosted by web server 50 on primary host 40. On the other hand, web server 90 could simply host web pages with similar content, and so forth.

In order to monitor the web server on the selected secondary server 70, the health monitor now communicates with health service 80. Communication with the primary host now preferably ceases.

Future requests for web pages are now serviced by web server 90 (step 180). This can be achieved in a number of ways. Two ways will be described below:

In accordance with the first way, each web page is typically defined by a Domain Object Model (DOM). A DOM specifies the way in which web page elements (text, images, and the like) are to be displayed (www.pcwebopaedia.com/TERM/D/DOM.html). Each web page accessed is cached at the client 5, and so the DOM also resides at the client. In the event of a failure, the health monitor updates the DOM of the content page, changing any html links for the primary server to point at the secondary web server. This is achieved via rewriter component 25 (see FIG. 3b).

This is preferably accomplished using Java™ script to return an array (linksArray) of all the link elements of the initial web page. An html link is typically of the form: <a href="www.hostname.com"></A>. Consequently, one way in which JavaScript may be used to return all the URL links on a page is as follows:

var linksArray=document.all.tags('A');

Alternatively var linksArray=document.links may be used.

Once an array of links has been achieved, it is possible to loop through the array to modify the target web server name:

```
for (var i=0;i<linksArray.length;i++)
{
        linksArray[i].hostname='server2.com';
}
```

.hostname is a valid property of the link object in JavaScript and is used to refer to the web server in this example.

The modified links have to then be inserted back into the DOM. Note, if the web page contains some web pages which link to the failed server and some which don't, a check will need to be performed to determine which links to change.

In accordance with the second way, an alternative mechanism is to have a Javascript link function hosted in the invisible control frame such that all the links in the content frame invoke this function with a relative URL having the currently operational server name held in a variable. In this way there is no need to parse the content DOM in order to change the link values. In some respects, this solution is preferable, since a user may not wish to access all links on a web page and the first solution parses the complete DOM without taking this into account.

In order to implement solution two described immediately above, each fragment of HTML in such web pages which contains a link might look as follows:

```
<!-- the link below will not need to be changed as the goLink function
will pick up the healthy server name -->
<A HREF="javascript;
top.invisible.goLink('/content/html/page1.html');">Page 1</A>
```

"invisible" is the given name of the invisible control frame. This piece of code invokes the goLink function and passes a partial or relative URL to this function. The partial URL omits the network address of the web server.

The goLink function in the invisible frame might look as follows:

```
function goLink(relativeURL) {
    var absoluteURL =
'http://'+healthyServer+relativeURL; // healthyServer is maintained by
the health monitoring components described above
        top.content.location.href=absoluteURL; }
```

Thus the goLink function receives the relative URL and uses this to create an absolute URL by adding the name of the healthy server to the relative URL. This of course assumes that pages on both servers follow the same naming format, and that only the server name differs.

The problem with this second solution is that the initial web page no longer follows the standard format. All links to other web pages on a web server have to be modified as discussed above.

Note, pages actually downloaded from the secondary host will already either point to other web pages on that secondary host or to a completely separate host.

Whatever solution is employed, when the user selects any link the web page is now loaded from the secondary host.

Once the change has been made to the secondary, it logically becomes the primary host and the failed one is now denoted the secondary host.

The example assumes the content available on both web servers is the same. This does not have to be the case. In the event of failure of a server, a user could be redirected to a web server that has different content maybe an explanation of the failure or a page to report the failure or a contact page.

In a preferred embodiment, the applet must be signed, in order that it can communicate with servers other than the one from which it was loaded. By default an applet can only communicate with the web server from which it is loaded. However, in signing the applet it is possible to configure it to communicate with other servers. Also, all web servers must be in the same "domain", e.g. ibm.com, in order that the two frames can work with each other, particularly if secure web pages are used.

Whilst the present invention has been described in terms of a health monitor which receives pushed data regarding the status of a web server, this is not a necessary condition of the invention. Instead, status information may be specifically requested by the health monitor. The health monitor may request the status only at the point when a new link is requested by the user. The advantage of this is that status requests are made only when a link is required, and thus processing power is saved. The disadvantage is that there may be a perceptible delay caused to the user whilst status is checked.

Further, whilst the preferred embodiment describes a health service on each host, this does not have to be the case.

For example the health service on the primary host could check the status of the web server on the secondary host. The disadvantage of this solution is that if the primary host itself fails, as opposed to just the primary's web server, then it is no longer possible to verify the status of the secondary host and its web server. Of course, another option is to have a health service on an entirely separate machine which monitors a number of web servers.

Additionally, whilst the present invention has been described in terms of downloading an initial web page including the applet, this is not a necessary condition of the invention. The health monitor may be downloaded as a generic plugin which may then be configured to work with any of a number of web servers.

Note, the description here has discussed a situation wherein the health service monitors web servers. However, a web server may interact with a number of backend resources such as servers, databases, and the like. The health service may also keep track of the status of such resources and provide status information which takes account of these resources. Thus, for example, failure may be reported if a resource is not working properly.

Finally, it is not essential that the health monitor communicate with a health service. In an alternative embodiment, the health monitor communicates directly with the web server it is monitoring. In this embodiment the web server provides the health monitor with an alternate server to use in the event of its failure.

What is claimed is:

1. A method operable at a client for handling failure of a first web server, the client being an originator of requests for web pages from the first web server, the method comprising:
   receiving, at a client, a web page having one or more links;
   determining status information for a first web server servicing the web page received by the client or status information for one or more links in the web page received by the client; and
   responsive to determining that the first web server has failed or a link in the web page has failed, rewriting, at the client, links in the web page at the client to point to a second web server, which is working.

2. The method of claim 1, further comprising periodically requesting status information for the first web server.

3. The method of claim 2, wherein periodically requesting the status information for the first web server comprises requesting the status information in response to a request by the client to link to a page hosted by the first web server.

4. The method of claim 1, wherein receiving a web page at the client comprises downloading a web page from which client requests originate, the web page being hosted by the first web server.

5. The method of claim 4, wherein the web page comprises a plurality of links to web pages hosted by the first web server, and wherein rewriting, at the client, links in the web page at the client comprises retrieving all web page links to the first web server; and rewriting retrieved web page links to point to the second web server.

6. The method of claim 4, wherein the downloaded web page comprises a plurality of links to web pages, wherein activation by a user of a link causes a link function to be executed, the link function operable to determine which web server is to be linked to, the method comprising:
   responsive to determining that the first web server hosting the web page requested has failed, using the link function to access the second web server.

7. The method of claim 4, further comprising receiving a request for a particular web page linked to from the first web server; and, responsive to determining that the first web server hosting the web page has failed, using a health monitor in a control frame of a web browser, to modify the link requested.

8. The method of claim 1, further comprising downloading a health monitor with a web page, the web page comprising a content frame for displaying visible content and a control frame containing the health monitor.

9. The method of claim 8, wherein the health monitor is configured with at least one alternative server to be used responsive to a failure of the first web server.

10. The method of claim 1, further comprising receiving a list of at least one alternative web server to be used if the first web server fails.

11. The method of claim 1, further comprising receiving status information about a workload being experienced by each of a plurality of possible alternative web servers; and using the workload information to select a working web server.

12. A health monitor operable at a client and for handling failure of a first web server, the client being an originator of requests for web pages from the first web server, the health monitor comprising:
   means, at a client, for receiving a web page having one or more links;
   means, at a client, for receiving status information for a first web server; and
   means, responsive to determining that the first web server has failed based on the status information, for redirecting client requests for web pages hosted by the first web server, which has failed, to a second web server, which is working,
      wherein redirecting client requests includes rewriting links at the client, in the first web page, to point to the second web server, which is working.

13. The health monitor of claim 12, further comprising:
   means, at the client, for periodically requesting the status information for the first web server.

14. The health monitor of claim 13, wherein the means for periodically requesting the status of the first web server comprises requesting the status in response to a request by the client to link to a page hosted by the first web server.

15. The health monitor of claim 12, further comprising:
   means for downloading a web page from which client requests originate, the web page being hosted by the first web server.

16. The health monitor of claim 15, wherein the web page comprises a plurality of links to web pages hosted by the first web server, and the means for redirecting client requests comprises:
   means for retrieving all web page links to the first web server; and
   means for rewriting retrieved web page links to point to the second web server.

17. The health monitor of claim 15, wherein the downloaded web page comprises a plurality of links to web pages, wherein activation by a user of a link causes a link function to be executed, the link function operable to determine which web server is to be linked to, the method comprising:
   responsive to determining that the first web server hosting the web page requested has failed, using the link function to access the second web server.

18. The health monitor of claim 15, further comprising:
   means for receiving a request for a particular web page linked to from the first web server; and
   means, responsive to determining that the first web server hosting the web page has Failed, for a health monitor to modify the link requested to point to the second web server.

19. The health monitor of claim 18, further comprising:
   means for downloading the health monitor with a web page, the web page comprising a content frame for displaying visible content and a control frame containing the health monitor.

20. A computer program product for providing a health monitor operable at a client for handling failure of a first web server, the client being an originator of requests for web pages from the first web server, said computer program product comprising a computer readable medium having compute program code tangibly embedded therein, the computer program code comprising:
   computer readable program code configured to receive, at a client, status information for the first web server; and
   computer readable program code configured to redirect client requests for web pages hosted by the first web server, which has failed, to a second web server, which is working, responsive to determining that the first web server has failed based on the status information,
      wherein links in a web page accessed by the client are rewritten at the client in order to redirect client requests to access the first web server,
      the rewritten links being rewritten at the client to point to the second web server, which is working.

* * * * *